US011361543B2

(12) United States Patent
Maley et al.

(10) Patent No.: US 11,361,543 B2
(45) Date of Patent: Jun. 14, 2022

(54) SYSTEM AND METHOD FOR DETECTING OBJECTS

(71) Applicant: Caterpillar Inc., Peoria, IL (US)

(72) Inventors: Jacob Charles Maley, Germantown Hills, IL (US); Pranay Kumar Reddy Kontham, Peoria, IL (US); Robert Scott McFarland, Peoria, IL (US); Vamsi Krishna Pannala, Peoria, IL (US); Peter Joseph Petrany, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 16/709,150

(22) Filed: Dec. 10, 2019

(65) Prior Publication Data
US 2021/0174088 A1 Jun. 10, 2021

(51) Int. Cl.
G06K 9/00 (2022.01)
G06V 20/30 (2022.01)
G06T 7/00 (2017.01)
G06N 20/00 (2019.01)
G06V 20/58 (2022.01)
G06V 20/64 (2022.01)

(52) U.S. Cl.
CPC ............ *G06V 20/30* (2022.01); *G06N 20/00* (2019.01); *G06T 7/97* (2017.01); *G06V 20/58* (2022.01); *G06V 20/64* (2022.01); *G06T 2207/10012* (2013.01); *G06T 2207/30261* (2013.01)

(58) Field of Classification Search
CPC .......... G06K 9/00677; G06K 9/00805; G06K 9/00201; G06T 7/97; G06T 2207/30261; G06T 2207/10012; G06N 20/00
USPC ....................................................... 382/103
See application file for complete search history.

(56) References Cited

U.S. PATENT DOCUMENTS

| 7,512,250 | B2 | 3/2009 | Lim et al. |
| 8,098,290 | B2 | 1/2012 | Mittal et al. |
| 8,867,790 | B2 | 10/2014 | Nanri et al. |
| 9,612,123 | B1* | 4/2017 | Levinson ............... G01C 21/32 |
| 9,665,777 | B2 | 5/2017 | Naikal et al. |
| 2013/0329052 | A1 | 12/2013 | Chew |
| 2017/0208244 | A1* | 7/2017 | Ahn ..................... H04N 5/2628 |
| 2019/0156485 | A1* | 5/2019 | Pfeiffer ............... G05D 1/0253 |

(Continued)

FOREIGN PATENT DOCUMENTS

CN 102291569 B 12/2011
KR 101347450 B1 1/2014

Primary Examiner — Stephen P Coleman
(74) Attorney, Agent, or Firm — Lee & Hayes, PLLC

(57) ABSTRACT

An object detection system may include an imager configured to generate image data indicative of an environment in which a machine is present, and a sensor configured to generate sensor data indicative of the environment in which the machine is present. The object detection system may further include an object detection controller including one or more object detection processors configured to receive an image signal indicative of the image data, identify an object associated with the image data, and determine a first location of the object relative to the position of the imager. The one or more object detection processors may also be configured to receive a sensor signal indicative of the sensor data, and determine, based at least in part on the sensor signal, the presence or absence of the object at the first location.

17 Claims, 4 Drawing Sheets

(56) References Cited

U.S. PATENT DOCUMENTS

2019/0163990 A1\* 5/2019 Mei ........................ G01C 21/32
2021/0034865 A1\* 2/2021 Nord .................... G06K 9/6292

\* cited by examiner

SYSTEM AND METHOD FOR DETECTING OBJECTS

TECHNICAL FIELD

The present disclosure relates to a system and method for detecting objects, and more particularly, to a system and method for detecting objects via an imager and a sensor.

BACKGROUND

Machines may be used to perform variety of tasks at a worksite. For example, machines may be used to excavate, move, shape, contour, and/or remove material present at the worksite, such as gravel, concrete, asphalt, soil, and/or other materials. Some machines may include a system for detecting objects at the worksite that may be of interest to the machine operator. However, such systems may be prone to inaccurately detecting objects, thereby reducing the value of such systems. For example, some object detection systems may falsely detect objects, sometimes resulting in an operator unnecessarily taking avoidance action, which may reduce productivity and increase operator fatigue. In some instances, if the system falsely detects objects with sufficient frequency, the operator may tend to ignore some object detections.

An attempt to provide an object detection device and method is described in U.S. Pat. No. 8,867,790 B2 to Nanri et al. ("the '790 patent"), issued Oct. 21, 2014. Specifically, the '790 patent describes an object detection device that purports to accurately identify an object candidate in captured stereo images as an object or a road surface. According to the '790 patent, the object detection device has a disparity map generator that generates a disparity map based on the stereo images, and a road surface estimator that estimates a road surface based on the disparity map. The object detection device of the '790 patent also includes an object candidate location extractor that extracts an object candidate region above the road surface based on the disparity map and the road surface, and an object identifying region extractor that extracts an object identifying region including a region around the object candidate region. The object detection device of the '790 patent also includes a geometric feature extractor that extracts a geometric feature of the object candidate based on the object identifying region, and an object identifying unit that identifies whether the object candidate is an object or a road surface based on the geometric feature.

Although the '790 patent purports to describe an object detection device that accurately identifies an object candidate in captured stereo images as an object or a road surface, the '790 patent does not describe a system or method for detecting objects that reduces or eliminates false object detections. The systems and methods described herein may be directed to addressing one or more of the possible concerns set forth above.

SUMMARY

According to a first aspect, an object detection system may include an imager configured to generate image data indicative of an environment in which a machine is present relative to a first position of the imager. The object detection system may also include a sensor configured to generate sensor data indicative of the environment in which the machine is present relative to a second position of the sensor. The object detection system may further include an object detection controller including one or more object detection processors configured to receive an image signal indicative of the image data, and identify an object associated with the image data. The one or more object detection processors may also be configured to determine a first location of the object relative to the first position of the imager. The one or more object detection processors may also be configured to receive a sensor signal indicative of the sensor data, and determine, based at least in part on the sensor signal, one of a presence of the object at the first location or an absence of the object at the first location.

According to a further aspect, a method for detecting an object may include receiving an image signal indicative of image data from an imager, identifying an object associated with the image data, and determining a first location of the object relative to a first position of the imager. The method may also include receiving a sensor signal indicative of sensor data generated by a sensor, and determining, based at least in part on the sensor signal, one of a presence of the object at the first location or an absence of the object at the first location.

According to another aspect, a machine may include a chassis and an imager mounted to the chassis at a first position of the chassis. The imager may be configured to generate image data indicative of an environment in which a machine is present relative to a first position of the imager. The machine may also include a sensor mounted to the chassis at a second position of the chassis spaced from the first position of the chassis. The sensor may be configured to generate sensor data indicative of the environment in which the machine is present relative to the second position of the sensor. The machine may also include an object detection controller including one or more object detection processors configured to identify, based at least in part on the image data, an object associated with the image data, and determine a first location of the object relative to the first position of the imager. The one or more object detection processors may also be configured to receive a sensor signal indicative of the sensor data and determine, based at least in part on the sensor signal, one of a presence of the object at the first location or an absence of the object at the first location.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

The present disclosure is generally directed to systems and methods for detecting objects in an environment, such as a worksite, using two or more sensors. In some examples, the two or more sensors may be independent from one another and may each be capable of detecting an object in the environment independently from one another and/or in combination with one another. In some examples, the two or more of the sensors may be sensors of a common sensor type, and in some examples, one or more of the sensors may be a different type of sensor. In some examples of the systems and methods, one of the sensors may detect an object in the environment and another sensor may be used to determine whether the detected object is a false detection. Some examples, of the systems and methods described herein may reduce or eliminate false detections of objects in the environment.

Figure 1:
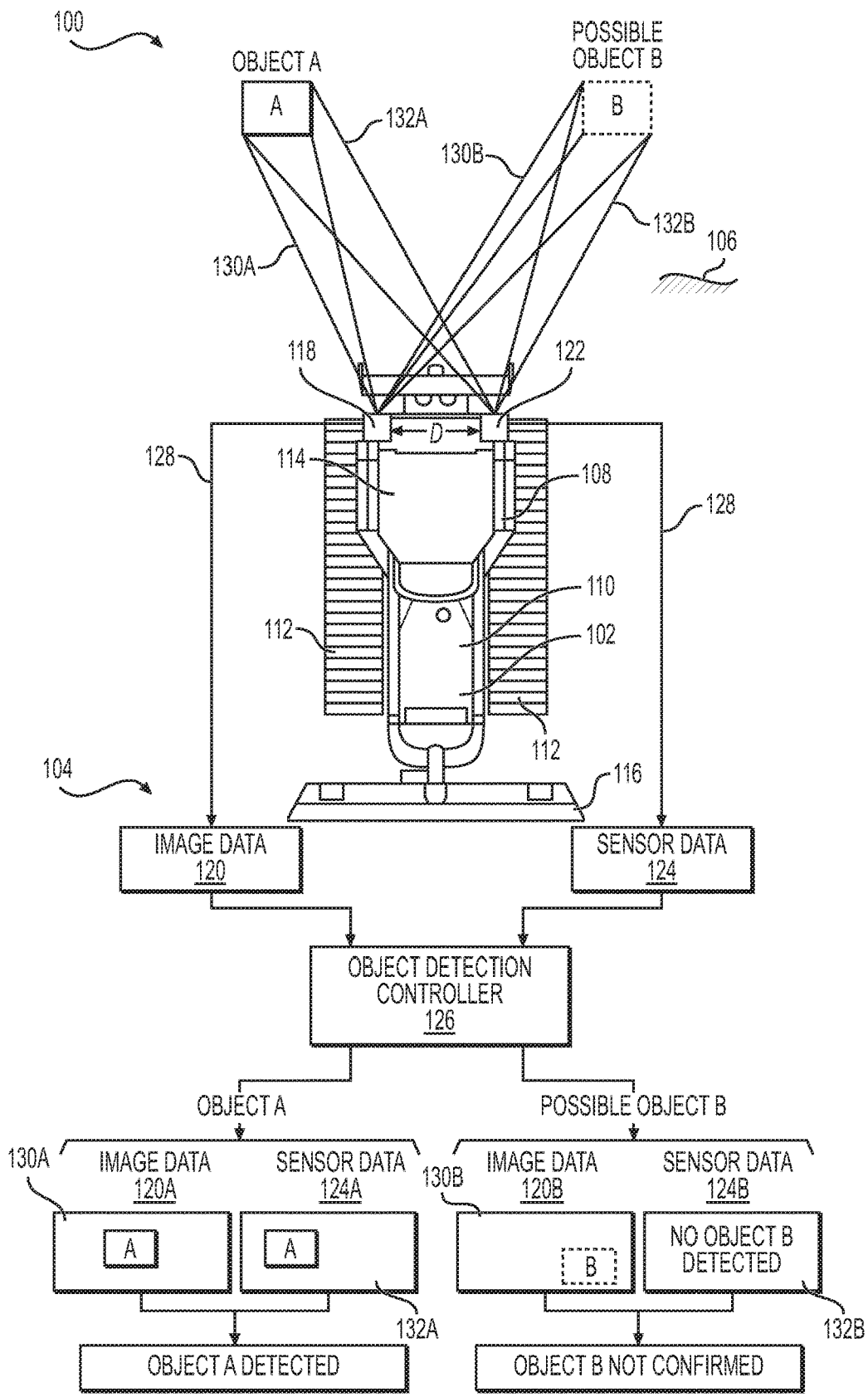
FIG. 1 is a block diagram depicting a schematic top view of an example environment including an example machine including an example system for detecting the presence or absence of an example object.

FIG. 1 is a block diagram depicting a schematic top view of an example environment 100, such as a worksite, including an example machine 102 including an example object detection system 104 for detecting the presence or absence of objects in the environment 100. The environment 100 may include terrain 106 on which the machine 102 operates. The example machine 102 shown in FIG. 1 is a dozer. However, the machine 102 may be any type of machine configured to travel across terrain, such as an automobile, a truck, an agricultural vehicle, and/or work vehicles, such as a wheel loader, a track loader, a skid-steer loader, a grader, an on-highway truck, an off-highway truck, and/or any other machine known to a person skilled in the art. The example machine 102 shown in FIG. 1 includes a chassis 108 to which is coupled a power source 110 configured to supply power for operation of the machine 102, including, for example, operating work implements, electronics, and steering, and/or for supplying torque to drive members to propel the machine 102 across the terrain 106. For example, the machine 102 shown in FIG. 1 includes a pair of tracks 112 coupled to the chassis 108 and configured to propel the machine 102 across the terrain 106. Although the example machine 102 includes tracks 112, it is contemplated that the machine 102 may include one or more wheels instead of, or in addition to, the tracks 112. The example machine 102 also includes a cab 114 coupled to the chassis 108 for protecting and/or providing comfort for an operator of the machine 102 and/or for protecting control-related devices of the machine 102. In some examples, the machine 102 may be semi-autonomous or fully autonomous and able to operate without an onboard or remote operator. The example machine 102 also includes a work implement 116 (e.g., a blade for the dozer) for performing operations associated with the machine 102, such as digging, shaving, smoothing, carrying, raising, and/or depositing material.

The example environment 100 shown in FIG. 1 includes an object A and a possible object B associated with the terrain 106. The object A and the possible object B may be any type of object with which it would be desirable for the machine 102 to avoid a collision, such as another machine, a structure such as a wall or building, a tree, a person, etc. In some examples, the machine 102 may include a collision avoidance system, which may be configured to assist an operator of the machine 102 (e.g., aboard the machine 102 or remote from machine 102), or an autonomous machine, with avoiding a collision between the machine 102 and an object in environment 100 through which machine 102 maneuvers, such as the object A and/or the possible object B.

In the example shown in FIG. 1, as mentioned above, the machine 102 includes an example object detection system 104. In some examples, the object detection system 104 may be incorporated into a collision avoidance system or may be independent of any such system. The example object detection system 104 shown in FIG. 1 includes an imager 118 configured to generate image data 120 indicative of the environment 100 in which the machine 102 is present relative to a position of the imager 118. In some examples, the imager 118 may be configured to generate time-stamp data, for example, based on one or more synchronous clocks, and the time-stamp data may be associated with the image data 120. In some examples, the time-stamp data may be used to temporally align two or more sets of sensor data. For example, the example imager 118 may be coupled to the chassis 108 of the machine 102 at a location relative to the machine 102. The imager 118 may be any known type of analogue or digital image sensor, digital camera, and/or digital video camera. For example, the imager 118 may be a high dynamic range (HDR) camera, a light-sensitive camera, and/or an ultra-sonic camera. Other suitable types of imagers are contemplated. The imager 118 may be selected to provide two-dimensional image data, three-dimensional image data, image sequences, gray image data, and/or color image data. In some examples, the imager 118 may be selected to provide depth data, absorption data, and/or reflectance data. In some examples, the imager 118 may be replaced with (or supplemented by) any known type of sensor, such as one or more light detection and ranging (LIDAR) sensors, one or more sound navigation ranging (SONAR) sensors, one or more radio detection and ranging (RADAR) sensors, or any other suitable sensor type.

As shown in FIG. 1, the example object detection system 104 may also include a sensor 122 configured to generate sensor data 124 indicative of the environment 100 in the which the machine 102 is present relative to a position of the sensor 122. In some examples, the sensor 122 may be configured to generate time-stamp data, for example, based on one or more synchronous clocks, and the time-stamp data may be associated with the sensor data 124. In some examples, the time-stamp data may be used to temporally align two or more sets of sensor data. For example, the sensor 122 may be coupled to the chassis 108 of the machine 102 at a location relative to the machine 102. In some examples, the sensor 122 may be an imager. For example, the sensor 122 may be any known type of analogue or digital image sensor, digital camera, and/or digital video camera. For example, the sensor 122 may be an HDR camera, a light-sensitive camera, and/or an ultra-sonic camera. Other suitable types of imagers are contemplated. The sensor 122 may be selected to provide two-dimensional image data, three-dimensional image data, image sequences, gray image data, and/or color image data. In some examples, the sensor 122 may be selected to provide depth data, absorption data, and/or reflectance data. In some examples, the sensor 122 may be any known type of sensor other than an imager, such as one or more LIDAR sensors, one or more SONAR sensors, one or more RADAR sensors, or any other suitable sensor type.

As shown in FIG. 1, in some examples, the imager 118 may be separated from the sensor 122, for example, by a distance D. In some examples, the distance D may be greater than about 1 foot. In some examples, the distance D may range from about 1 foot to about 20 feet, from about 1 foot to about 15 feet, from about 1 foot to about 10 feet, from about 1 foot to about 8 feet, from about 2 feet to about 8 feet, from about 4 feet to about 8 feet, or from about 5 feet to about 8 feet. The distance D may be configured to provide different frames of reference for each of the imager 118 and the sensor 122, for example, as explained herein with respect to FIGS. 2 and 3.

In the example shown in FIG. 1, the imager 118 and the sensor 122 are mounted to a rear portion of the machine 102 and facing backwards relative to a front portion of the machine 102. It is contemplated that one or more of the imager 118 or the sensor 122 may be mounted to other portions of the machine 102 and/or facing different directions relative to the machine 102. In some examples, at least a portion of the field of view of the imager 118 and at least a portion of the field of view the sensor 122 may at least partially overlap.

As shown in FIG. 1, some examples of the object detection system 104 may include an object detection controller 126. As explained in more detail with respect to FIGS. 2 and 3, the object detection controller 126 may include one or more object detection processors configured to determine, based at least in part on one or more sensor signals including the sensor data 124 (and/or the image data 120), either the presence of an object at a first location or the absence of the object at the first location. For example, the object detection controller 126 may be in communication with the imager 118 and/or the sensor 122, for example, via a wired and/or a wireless communication link 128. Although FIG. 1 shows a single object detection controller 126 in communication with both the imager 118 and the sensor 122, each of the imager 118 and the sensor 122 may be in communication with a separate object detection controller configured to be in communication with the imager 118 and the sensor 122, respectively. Although FIG. 1 shows a single imager 118 and a single sensor 122, the imager 118 may include more than one imager, and/or the sensor 122 may include more than one sensor, and in some examples, one or more of the one or more imagers and/or one or more of the one or more sensors may be in communication with one or more object detection controllers. In some examples in which the imager 118 and the sensor 122 are in communication with separate object detection controllers, each of the object detection controllers may be configured to determine whether an object is present in the environment 100 based on the respective image data 120B and sensor data 124B.

As shown in FIG. 1, the example object detection controller 126 may be configured to receive an image signal indicative of the image data 120, for example, from the imager 118. The object detection controller 126 may be configured to identify an object associated with the image data 120, for example, using known image analysis techniques (e.g., known digital analysis techniques), such as by analyzing gradients in the image data 120 to identify objects. In some examples, the object detection controller 126 may also be configured to determine a location of the object relative to a position of the imager 118, for example, with respect to the machine 102. In some examples, the position and the orientation of the imager 118 and the field of view of the imager 118 relative to the machine 102 may be known and/or calibrated, for example, such that if the position and orientation of the machine 102 are known, the position and orientation of the imager 118 and the field of view of the imager 118 relative to the environment 100 may be determined.

In some examples, the object detection controller 126 may also be configured to receive a sensor signal indicative of the sensor data 124, for example, from the sensor 122. In some examples, the object detection controller 126 may be configured to identify an object associated with the sensor data 124, which in some examples may be image data, using known sensor data analysis techniques (e.g., known digital analysis techniques), such as by analyzing gradients in the sensor data 124 to identify objects. In some examples, the object detection controller 126 may also be configured to determine a location of the object relative to a position of the sensor 122, for example, with respect to the machine 102. In some examples, the position and the orientation of the sensor 122 and the field of view of the sensor 122 relative to the machine 102 may be known and/or calibrated, for example, such that if the position and orientation of the machine 102 are known, the position and orientation of the sensor 122 and the field of view of the sensor 122 relative to the environment 100 may be determined. In some examples, the position and the orientation of the sensor 122 and the field of view of the sensor 122 relative to the position and orientation of the imager 118 and the field of view of the imager 118 may be known and/or calibrated, for example, to enhance the accuracy of the object detection system 104.

In some examples, the object detection controller 126 may be configured determine, based at least in part on the sensor signal, a presence or an absence of the object at the location based on the image data 120. Based on this determination, in at least some examples, the object detection controller 126 may be configured to determine whether the object detected by the imager 118 is a false detection (e.g., the object is not actually present at the location detected by the imager 118). For example, the object detection controller 126 may use the sensor data 124 to determine whether an object is actually present at the location indicated by the imager 118. This example process may be used to reduce or eliminate false detections of objects detected by an imager and/or other types of sensors.

For example, FIG. 1 shows the example imager 118 detecting an object A in the environment 100 in which the machine 102 is located. As shown, image data 120A is communicated to the object detection controller 126, which analyzes the image data 120A to determine that the object A is present in the image data 120A (e.g., the image data 120A is indicative of the object A being within the field of view 130A of the imager 118). As mentioned, some examples of the object detection controller 126 may use known image analysis techniques to determine whether the sensor data 120A includes data indicative that the object A is located within the field of view 130A of the imager 118 and, in some examples, where the object A is located relative to the imager 118 and/or the machine 102.

In some examples, in order to determine whether the object A detected by the imager 118 is actually present in the environment 100, for example, at the location determined by the object detection controller 126, the object detection system 104 may use the sensor data 124A generated by the sensor 122 to determine the presence or the absence of object A in the environment 100. For example, sensor data 124A may be communicated to the object detection controller 126, which analyzes the sensor data 124A to determine whether the object A is present in the sensor data 124A (e.g., whether the sensor data 124A is indicative of the object A being within the field of view 132A of the sensor 122). As shown in FIG. 1, the image data 120A indicates that the object A is within the field of view 130A of the imager 118, and the sensor data 124A also indicates that the object A is within the field of view 132A of the sensor 122. As a result, in this example related to object A, the sensor data 124A verifies that the object A detected by the imager 118 is present in the environment 100 at the location determined by the object detection controller 126. In some examples, as explained with respect to FIGS. 2 and 3, the object detection controller 126 may be configured to determine the location of an object detected by the imager 118 relative to the imager 118 and/or the machine 102 based at least partially on the image data 120, and determine a projected location of the object detected by the imager 118 relative to the sensor 122. If the object detected by the imager 118 is not detected by the sensor 122 at the projected location relative to the sensor 122, then the object detection controller 126 may determine that the object detection by the imager 118 is a false detection, and thus is not actually present in the environment 100 at the location determined based on the image data 120.

For example, FIG. 1 also shows the example imager 118 detecting a possible object B in the environment 100 in which the machine 102 is located. As shown, image data 120B is communicated to the object detection controller 126, which analyzes the image data 120B to determine that the object B is present in the image data 120B (e.g., the image data 120B is indicative of the object B being within the field of view 130B of the imager 118). As mentioned above, some examples of the object detection controller 126 may use known image analysis techniques to determine whether the sensor data 120B includes data indicative that the object B is located within the field of view 130B of the imager 118 and, in some examples, where the object B is located relative to the imager 118 and/or the machine 102.

In contrast with the example involving the object A, with respect to the object B, FIG. 1 shows the imager 118 detecting the object B in the environment 100 in which the machine 102 is located. Image data 120B is communicated from the imager 118 to the object detection controller 126, which analyzes the image data 120B and determines that the object B is present in the image data 120B (e.g., the image data 120B is indicative of the object B being within the field of view 130B of the imager 118).

In the example relating to the object B, the object detection system 104 may use the sensor data 124B generated by the sensor 122 to determine the absence of the object B in the environment 100. For example, the sensor data 124B is communicated to the object detection controller 126, which analyzes the sensor data 124B to determine whether the object B is present in the sensor data 124B (e.g., whether the sensor data 124B is indicative of the presence or absence of the object B being within the field of view 132B of the sensor 122). As shown in FIG. 1, while the image data 120B indicates that the object B is within the field of view 130B of the imager 118, the sensor data 124B does not indicate that the object B is within the field of view 132B of the sensor 122. As a result, in this example related to the object B, the sensor data 124B reduces or excludes that possibility that the object B detected by the imager 118 is actually present in the environment 100 at the location determined by the object detection controller 126 based at least partially on the image data 120B. For example, the object detection controller 126 may be configured to determine the location of the object B detected by the imager 118 relative to the imager 118 and/or the machine 102 based at least partially on the image data 120B, and determine a projected location of the object B detected by the imager 118 relative to the sensor 122. If the object B, as detected by the imager 118, is not detected by the sensor 122 at the projected location relative to the sensor 122, then the object detection controller 126 may determine that the object B detection by the imager 118 is a false detection, and thus is not actually present in the environment 100 at the location determined based on the image data 120B.

Figure 2:
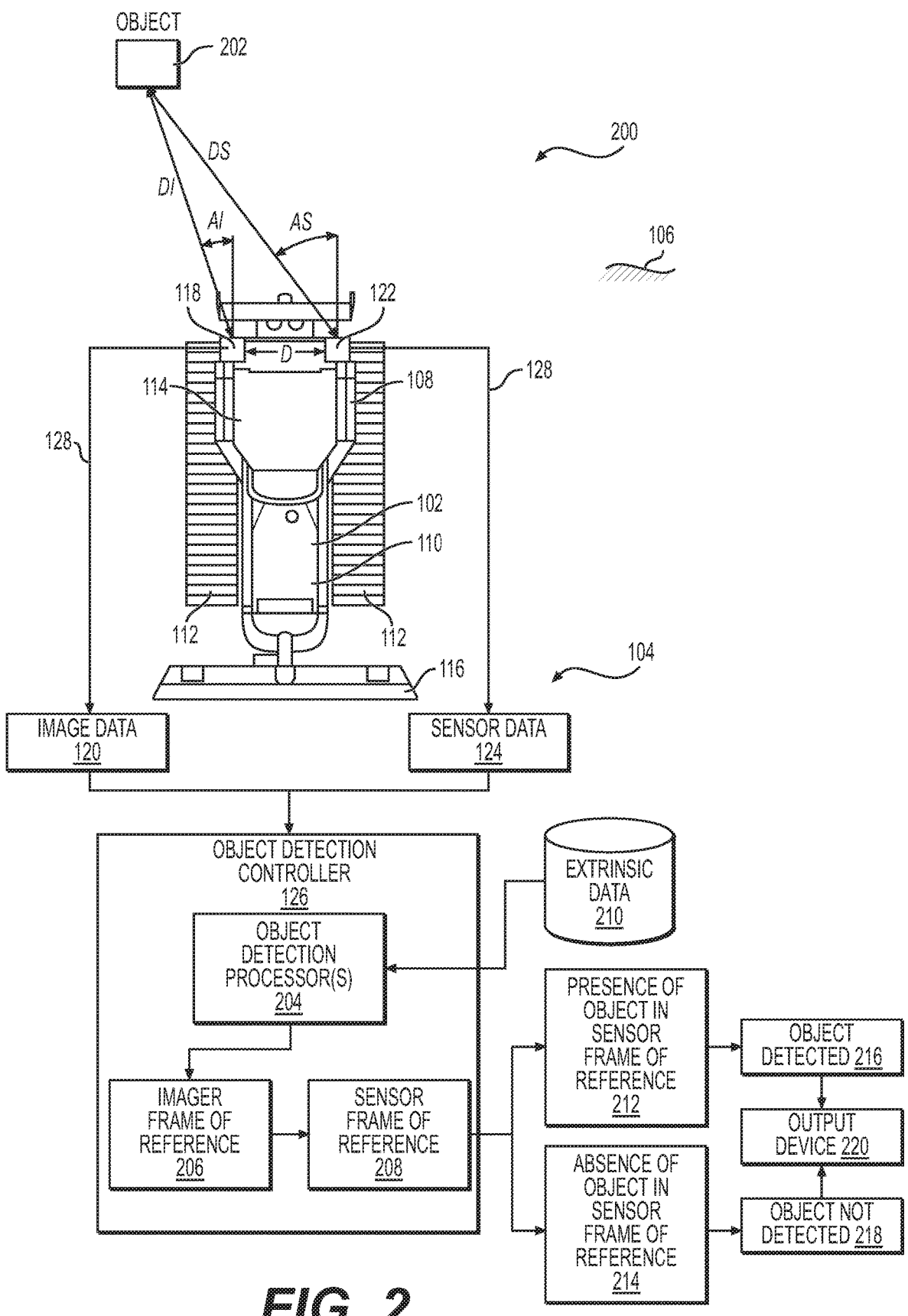
FIG. 2 is a block diagram depicting a schematic top view of an example environment including an example machine detecting the presence of an example object at the worksite.

FIG. 2 is a block diagram depicting a schematic top view of an example environment 200 (e.g., a worksite) including an example machine 102 detecting the presence of an example object 202. As shown in FIG. 2, the imager 118 and the sensor 122 generate image data 120 and sensor data 124 indicative of the environment 200, which includes the object 202. The image data 120 and the sensor data 124 are communicated to the object detection controller 126. In the example shown, the object detection controller 126 includes one or more object detection processors 204 configured to analyze the image data 120 and/or the sensor data 124. For example, the one or more object detection processors 204 may be configured to use image and/or sensor data analysis techniques for identifying the object 202 and/or the location of the object 202 relative to the imager 118, the sensor 122, and/or the machine 102. For example, the object detection processors 204 may be configured to execute an analytical model configured to use known image analysis techniques (e.g., known digital analysis techniques), such as by analyzing gradients in the image data 120, to identify the object 202 in the image data 120 and/or the sensor data 124. Other sensor data analysis techniques are contemplated.

In some examples, the object detection system 104 may include one or more controllers (e.g., including the object detection controller 126), one or more processors (e.g., including the one or more object detection processors 204), a memory, and/or other components described herein with respect to the machine 102. The object detection controller 126, in some examples, may include an ECU, such as an electronic control module (ECM), a central control module (CCM), a central timing module (CTM), a general electronic module (GEM), a control unit, and/or any other types of ECUs. The ECUs may include hardware and embedded software that assist in the operation of the machine 102 and/or the object detection system 104.

In some examples, the one or more object detection processors 204 may also be configured to determine a location of the object 202 relative to a position of the imager 118, for example, with respect to the machine 102, and/or relative to the position of the sensor 122, for example, with respect to the machine 102. For example, the object detection processor(s) 204 may be configured to determine the distance DI between the imager 118 and the object 202 and/or the distance DS between the sensor 122 and the object 202. In some examples, the object detection processor(s) 204 may also be configured to determine an angle AI between the direction in which the imager 118 is facing and the location of the object 202, and/or an angle AS between the direction the sensor 122 is facing and the location of the object 202. In some examples, the angle AI and/or the angle AS may include both a lateral component (e.g., within a substantially horizontal plane) and an elevation component (e.g., within a substantially vertical plane).

As shown in FIG. 2, some examples of the one or more object detection processors 204 may be configured to determine an imager frame of reference 206 indicative of the direction in which the imager 118 is facing (e.g., its orientation) and/or the field of view 130A of the imager 118 (see FIG. 1). For example, the direction in which the imager 118 is facing may have both a lateral component and an elevation component, and the direction may correspond to the geometric center of the field of view 130A of the imager 118. In some such examples, the one or more object detection processors 204 may also be configured to determine a sensor frame of reference 208 indicative of the direction in which the sensor 122 is facing (e.g., its orientation) and/or the field of view 132A of the sensor 122 (see FIG. 1). For example, the direction in which the sensor 122 is facing may have both a lateral component and an elevation component, and the direction may correspond to the geometric center of the field of view 132A of the sensor 122.

In some examples, the position and the orientation of the imager 118 and the field of view of the imager 118 relative to the machine 102 may be known and/or calibrated, for example, such that if the position and orientation of the machine 102 are known, the position and orientation of the imager 118 and the field of view of the imager 118 relative to the environment 100 may be determined. Similarly, the position and the orientation of the sensor 122 and the field of view of the sensor 122 relative to the machine 102 may be known and/or calibrated, for example, such that if the position and orientation of the machine 102 are known, the position and orientation of the sensor 122 and the field of view of the sensor 122 relative to the environment 100 may be determined. For example, the object detection system 126, including the one or more object detection processors 204, may be configured to receive extrinsic data 210 including data relating the location and/or the orientation of the imager 118 and/or the location and/or the orientation of the sensor 122 to the orientation of the machine 102. For example, the imager 118 and/or the sensor 122 may be mounted to the machine 102 at known locations relative to the machine 102, and, in some examples, the imager 118 and/or the sensor 122 may be mounted to the machine 102 at known orientations relative to the orientation of the machine 102. In some examples, once the imager 118 and/or the sensor 122 are mounted to the machine 102, the object detection system 126 may be configured to be calibrated, for example, so that the locations and/or the orientations of the imager 118 and/or the sensor 122 relative to the machine 102 may be determined, for example, via known calibration techniques.

In some examples, the relative locations and/or the relative orientations of the imager 118 and the sensor 122 may be included in the extrinsic data 210, such that the object detection processor(s) 204 may determine the imager frame of reference 206, the sensor frame of reference 208, and/or a spatial relationship between the imager frame of reference 206 and the sensor frame of reference 208. In some examples, the spatial relationship may be used to determine a projected location of the object 202 relative to the position and/or orientation of the sensor 122, for example, by transforming the location of the object 202 from the imager frame of reference 206 associated with the position and/or orientation of the imager 118 to the sensor frame of reference 208 associated with the position and/or orientation of the sensor 122.

In some examples, the one or more object detection processors 204 may be configured to substantially temporally align the image data 120 and the sensor data 124. In some such examples, substantially temporally aligning the image data 120 with the sensor data 124 may improve the accuracy of the object detection system 104, for example, by increasing the likelihood that objects detected based on the image data 120 at a particular location and objects detected based on the sensor data 124 at the particular location are the same objects. Further, it may increase the likelihood that objects detected based on the image data 120 at a particular location and that are actually present at the particular location are also detected (or verified) based on the sensor data 124 indicative that the object is at the particular location. For example, if the machine 102 is moving and thus the imager 118 and the sensor 122 are moving, and/or the object 202 is moving (e.g., the machine 102 and object are moving relative to one another), without temporally aligning the image data 120 and the sensor data 124, the accuracy of object detections may be relatively reduced.

In some examples, the object detection processor(s) 204 may be configured to determine a location of the object 202 relative to the imager 118 and, based at least in part on the location of the object 202 relative to the imager 118, determine a projected location of the object 202 relative to the sensor 122. For example, the one or more object detection processors 204 may be configured to transform the location of the object 202 in the imager frame of reference 206 to a projected location of the object 202 in the sensor frame of reference 208. For example, by knowing the relationship between the imager frame of reference 206 and the sensor frame of reference 208, a location in the imager frame of reference 206 (e.g., of the object 202) may be transformed into a corresponding (or projected) location in the sensor frame of reference 208. Thus, in some examples, if the location of the object 202 is known relative to the imager frame of reference 206, the projected location of the object 202 in the sensor frame of reference 208 may be determined.

As shown in FIG. 2, the object detection processor(s) 204 may be configured to determine, based at least in part on the location of the object 202 relative to the imager 118 and the projected location of the object 202 relative to the sensor 122, either a presence of the object 202 at the projected location in the sensor frame of reference 208, as depicted at 212 in FIG. 2, or an absence of the object 202 at the projected location in the sensor frame of reference 208, as depicted at 214 in FIG. 2. Based at least in part on the presence or absence of the object 202 at the projected location, the object detection controller 126 may determine that either (1) the object 202 is detected, as depicted at 216, if present at the projected location in the sensor frame of reference 208 or (2) that the object 202 in not detected, as depicted at 220, if absent at the projected location in the sensor frame of reference 208. Thus, the sensor 122, in at least some such examples, may be used to verify that the object 202 detected by the imager 118 is present at the location determined based at least in part on the image data 120, or to determine that the object detected by the imager 118 is not an object and/or that the object is not located at the location determined based at least in part on the image data 120. This may result in reducing or eliminating the effects of false detections of objects by the imager 118. As shown in FIG. 2, in some examples, the object detection system 104 may be configured to communicate the presence or absence of the object 202 to an output device 220, which may include any device that may use a signal indicative of the presence or absence of the object 202, for example, to display an image indicative the presence or absence and/or cause a responsive action, such as at least partially control maneuvering of the machine 102 and/or communicating the presence or absence to a location remote from the machine 102.

Figure 3:
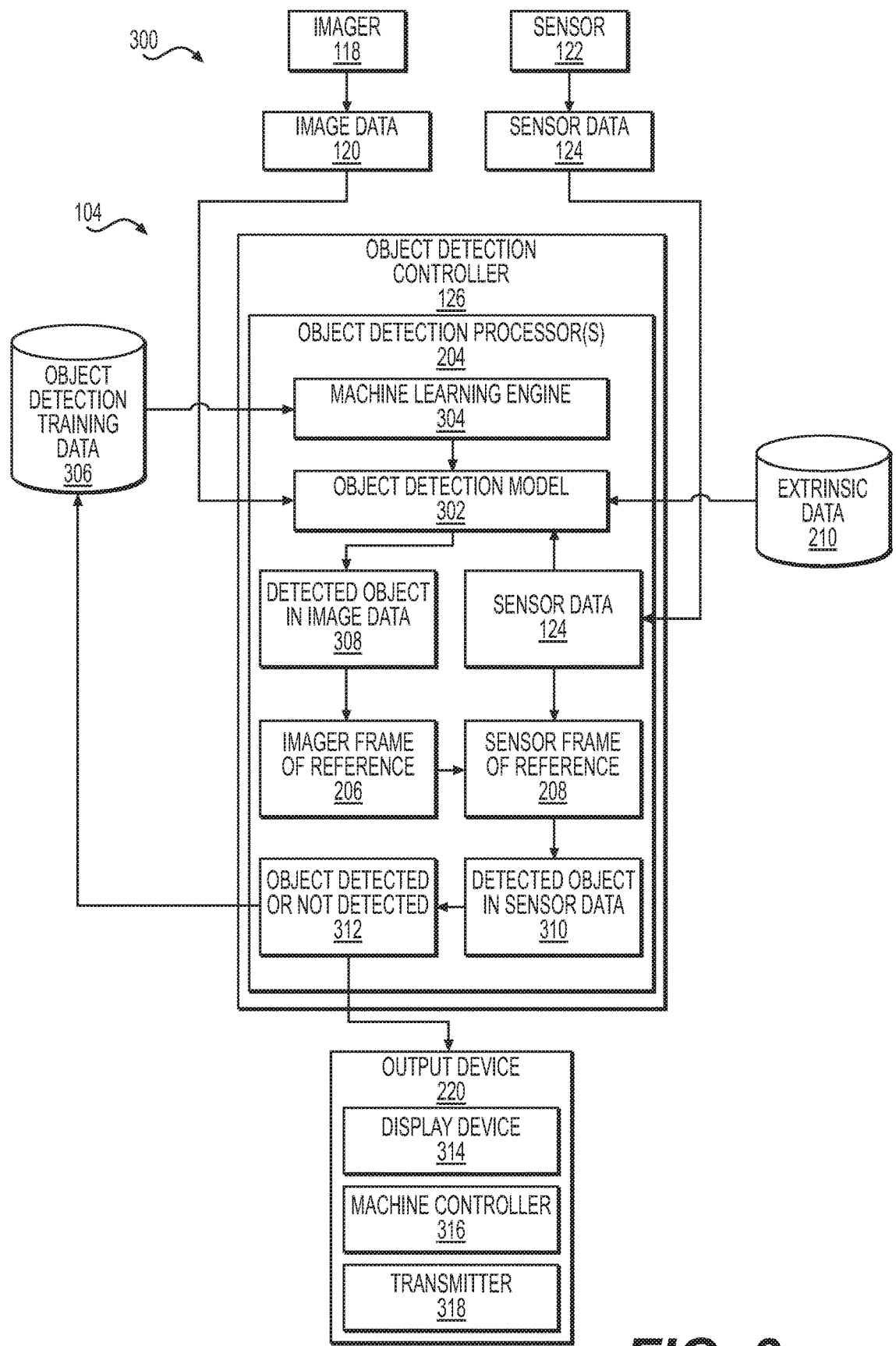
FIG. 3 is a block diagram illustrating an example object detection system including an example object detection controller and an example object detection model configured to detect objects using an example imager and an example sensor.

FIG. 3 is a block diagram illustrating an example object detection system 104 including an example object detection controller 126 configured to detect objects in an environment 300. For example, the object detection system 104 shown in FIG. 3 includes an example object detection model 302 configured to detect objects using an example imager 118 and an example sensor 122. As mentioned with respect to FIG. 2, some examples of the object detection system 104 may be configured to execute an analytical model configured to detect objects represented in the image data 120 and/or in the sensor data 124. For example, the object detection controller 126 shown in FIG. 3 includes one or more object detection processors 204 configured to execute the object detection model 302, which may be configured to determine, based at least in part on the image data 120 and/or the sensor data 124, the presence and/or location of an object in the environment 300.

In the example shown in FIG. 3, the object detection model 302 is developed by a machine learning engine 304. Although FIG. 3 schematically depicts the machine learning engine 304 and the object detection model 302 as part of the same object detection processor(s) 204 block, the machine learning engine 304 may be in one or more processors that are different from the one or more processors in which the object detection model 302 is executed. For example, the object detection system 104 may communicate the image data 120 and/or the sensor data 124 (e.g., via a transmitter or transceiver) to the object detection model 302, and the object detection model 302 may, in some examples, detect objects, based at least in part on the image data 120 and/or sensor data 124. In some such examples, the machine learning engine 304 may be used to train the object detection model 302. For example, the machine learning engine 304 may be used to train the object detection model 302 via object detection training data 306 used as ground truth data, for example, correlating characteristics of the image data 120 and/or the sensor data 124 with verified object detections. In some examples, the object detection training data 306 may include data associated with a plurality of previous interactions, and/or other feedback or interactions with the object detection model 302, such as theoretically- and/or empirically-derived data. In some examples, the one or more object detection processors 204 may be configured to generate the object detection training data 306 for training the object detection model 302, and the object detection training data 306 may include object detection data associated with determining (1) the presence of an object at a location based at least in part on the image data 120 and/or the sensor data 124, or (2) the absence of the object at the location based at least in part on the image data 120 and/or the sensor data 124.

In some example embodiments, confidence levels may be associated with the object detection verifications, and the confidence levels may provide an indication of the relative confidence of the accuracy of future object detections. In some examples, the machine learning engine 304 may employ one or more algorithms, such as supervised learning algorithms (e.g., convolutional neural networks, artificial neural networks, Bayesian statistics, support vector machines, decision trees, random forest, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Other types of machine learning algorithms are contemplated.

As shown in FIG. 3, the example object detection system 104 may include an imager 118 configured to generate image data 120 indicative of the environment 300 and a sensor 122 configured to generate sensor data 124 indicative of the environment 300. In some examples, the imager 118 and/or the sensor 122 may be configured to generate time-stamp data, for example, based on one or more synchronous clocks, and the time-stamp data may be associated with the image data 120 and/or the sensor data 124. In some examples, the time-stamp data may be used to temporally align two or more sets of sensor data. The image data 120 and the sensor data 124 may be communicated via one or more communication links 128 to the object detection controller 126. In the example shown, the object detection controller 126 includes one or more object detection processors 204 configured to execute the object detection model 302, which may be configured to identify and/or locate objects represented in the image data 120 and/or the sensor data 124. In some examples, the object detection model 302, based at least in part on the image data 120, may be configured to identify and/or locate, relative to the imager 118, a detected object in the image data as depicted at 308. In some examples, the object detection processor(s) 204 may also be configured to determine an imager frame of reference 206 and transform the imager frame of reference 206 to the sensor frame of reference 208, for example, as described herein with respect to FIG. 2. The object detection processor(s) 204, based at least in part on the sensor data 124, may be configured to determine whether the detected object in the image data 308 is represented in the sensor data 124. For example, the object detection processor(s) 204 may be able to determine whether the detected object from the image data 308 is represented as a detected object in the sensor data 124 as depicted at 310. In some examples, this may include determining whether the detected object in the image data 120 is located at a projected location in the sensor frame of reference 208, based at least in part on the location determined based on the image data 120. The object detection system 104 may be configured to determine whether or not the object is detected as depicted at 312, for example, as described herein with respect to FIG. 2.

Once the object detection system 104 has determined whether the object has been detected, for example, the object has been detected and/or located based at least in part on the image data 120 and its detection and/or location has been verified based at least in part on the sensor data 124, the object detection system 104 may be configured to communicate the determination to an output device 220. For example, the ouput device 220 may include one or more of a display 314 configured to display an image representative of the determination. In some examples, communicating the determination may include communicating the determination to a machine controller 316 configured to at least partially affect maneuvering and/or operation of the machine 102.

For example, the machine controller 316 may be configured to alert an operator of the machine 102 about the presence of the object so that the operator may appropriately maneuver the machine 102 in the presence of the object. In some examples, the machine controller 316 may be configured to automatically cause the machine 102 to maneuver appropriately in the presence of the object, for example, to prevent an operator from accidentally colliding with or maneuvering undesirably close to the object. In examples where the machine 102 is semi-autonomous or fully-autonomous, prevent the machine 102 from accidentally colliding with or maneuvering undesirably close to the object. In some examples, the output device 220 may include a transmitter (or transceiver) to communicate the determination to a location remote from the machine 102, such as a data receiving site for collecting and/or storing data associated with the environment 300. Such data may be communicated to other machines and/or personnel, for example, so that other machines may avoid colliding with or maneuvering undesirably close to the object. In contrast, if the object detection system 104 determines that the object detected based on the image data 120 is not actually present (e.g., the object detection system 104 determines at least partially based on the sensor data 124 that the object is not actually present at the location determined based on the image data 120), operation of the machine 102 (and potentially other machines) will not be unnecessarily affected by the false object detection based on the image data 120.

Figure 4:
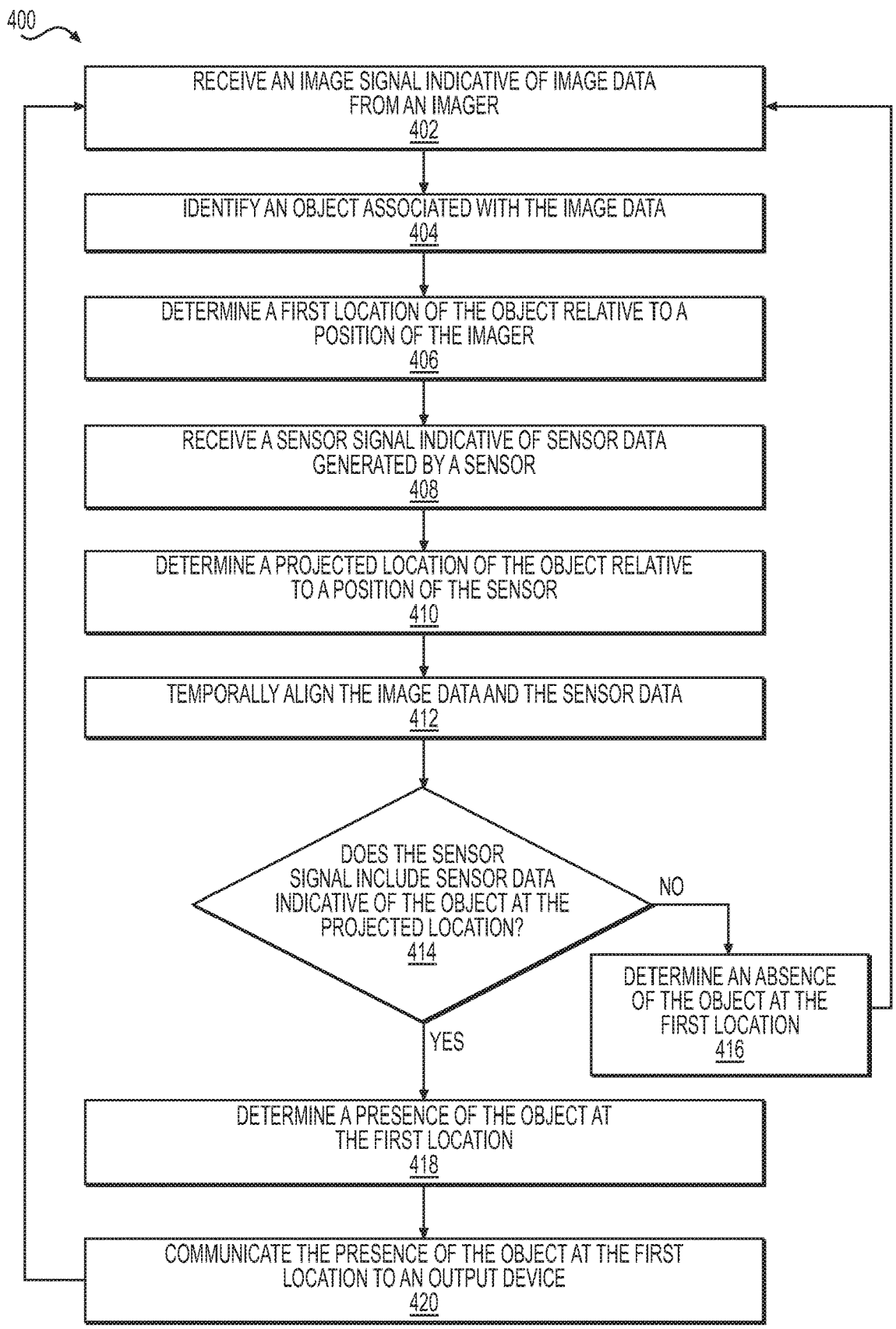
FIG. 4 an example process for detecting objects in an example environment.

FIG. 4 illustrates an example process 400 for detecting objects in an example environment, such as a worksite. This process 400 is illustrated as a logical flow graph, operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process.

FIG. 4 illustrates a flow diagram of an example process 400 for detecting objects in an example environment, such as a worksite. The example process 400, at 402, may include receiving an image signal indicative of image data from an imager. In some examples, the image signal may also be indicative of time-stamp data, for example, based on one or more synchronous clocks, and the time-stamp data may be associated with the image data. In some examples, the time-stamp data may be used to temporally align two or more sets of sensor data. For example, a machine in the environment may include an imager mounted to the machine, and the imager may be configured to generate one or more image signals including image data indicative of objects in the environment. The one or more image signals may be communicated to an object detection controller, for example, via a hard-wired and/or wireless link.

The example process 400, at 404, may include identifying an object associated with the image data. For example, the object detection controller may receive the image data and use one or more image data analysis techniques to identify an object in the environment. For example, the object detection controller may be configured to identify objects based on gradients in the image data. In some examples, the object detection controller may include one or more object detection processors executing an object detection model configured to identify one or more objects represented in the image data. In some examples, the object detection model may be developed by a machine learning engine.

At 406, the example process 400 may include determining a first location of the object relative to a position of the imager. For example, the object detection controller may be configured to determine a distance between the position of the imager and the location of the object, and/or determine an angle indicative of the first location of the object relative to the direction in which the imager is facing.

The example process 400, at 408, may also include receiving a sensor signal indicative of sensor data generated by a sensor. For example, the machine may include a sensor mounted to the machine, and the sensor may be configured to generate one or more sensor signals including sensor data indicative of objects in the environment. The one or more sensor signals may be communicated to an object detection controller, for example, via a hard-wired and/or wireless link. The object detection controller may be the same as the object detection controller that receives the image data, or the object detection controller receiving the sensor data may be different than the object detection controller that receives the image data.

At 410, the example process 400 may include determining a projected location of the object relative to a position of the sensor. For example, the object detection controller may be configured to transform the first location of the object relative to the imager from a first frame of reference associated with the position of the imager to a second frame of reference associated with a position of the sensor, as described herein.

The example process 400, at 412, may include substantially temporally aligning the image data and the sensor data, for example, based on time-stamp data associated with the image data and the sensor data, respectively. For example, the object detection controller may analyze image data and sensor data that were generated at an at least partially overlapping time period.

At 414, the example process 400 may include determining whether the sensor signal includes sensor data indicative of the object being at the projected location. For example, the image data indicates that the object is at the first location relative to the imager, and the object detection controller projects a location at which the object, if present, would be expected to appear in the sensor data relative to the location of the sensor. At 414, the object detection controller determines whether the sensor signal includes sensor data indicative of the object being present at the projected location.

If at 414 it is determined that the sensor signal does not include sensor data indicative of the object being present at the projected location, at 416, the example process 400 may include determining the absence of the object of the location of the object identified based on the image data. In this example manner, the process 400 may identify a false detection of the object by the imager and/or the object detection controller. In some examples of the process 400, the absence of the object may be communicated to an output device, for example, as described herein. In some examples of the process 400, once the absence of the object has been determined, the process may return to 402.

If at 414 it is determined that the sensor signal includes sensor data indicative of the object being present at the projected location, at 418, the example process 400 may include determining the presence of the object of the location of the object identified based on the image data. In this example manner, the process 400 may verify the detection of the object by the imager and/or the object detection controller. For example, the imager and/or the object detection controller have detected an object in the environment at a location relative to the imager, and the object detection controller has verified the detection and location of the object based on sensor signals including sensor data received from the sensor having a different frame of reference than the frame of reference of the imager.

At 420, the example process 400 may include communicating the presence of the object at the location relative to the imager to an output device, for example, as described herein. In some examples of the process 400, once the presence of the object has been verified, the process may include returning to 402.

INDUSTRIAL APPLICABILITY

The systems and methods described herein may be used in association with operation of machines at a worksite. For example, a machine may be configured to operate at the worksite, including maneuvering at the worksite, for example, to perform tasks associated with the worksite. The machine may include an object detection system for detecting an object at the worksite, for example, according to the examples described herein. In some examples, the system may include two or more sensors, which may include imagers and/or other sensor types. In some examples of the systems and methods, one of the sensors may detect an object in the environment and another sensor may be used to determine whether the object detection amounts to a false object detection. Some examples of the systems and methods described herein may reduce or eliminate false detections of objects in the environment, which may improve the usefulness of the object detection system, improve productivity related to the machine, and/or reduce operator fatigue.

For example, a worksite such as a landfill, construction site, or mining site, may include numerous surfaces, which may generate image gradients and/or reflections that may be interpreted by an imager and associated image processor as objects at the worksite. At some such worksites, the imager and image processor may erroneously detect objects due to the image gradients and/or reflections. Such false object detections may reduce the value of an object detection system, for example, by causing an operator of a machine to unnecessarily take avoidance action, which may reduce productivity and increase operator fatigue, and in some instances, if the system falsely detects objects with sufficient frequency, the operator may tend to ignore some object detections.

In some examples, the object detection systems and related methods described herein may reduce or eliminate false object detections. In some examples, the object detection system may include an imager and a sensor mounted to the machine and configured to generate image data and sensor data indicative of the environment in which the machine maneuvers. In some examples, the sensor may also include an imager, although other non-imager sensor types are contemplated. An object detection controller may receive the image data and identify an object and/or its location relative to the imager. The object detection controller may also transform the frame of reference of the imager to a frame of reference of the sensor and determine a projected location of the object in the frame of reference of the sensor based on the location of the object in the frame of reference of the imager. If the object detection controller determines that the object is not included in the sensor data at the projected location in the frame of reference of the sensor, the object detection controller may be configured to identify the object detection based on the image data as a false object detection. In contrast, if the object is included in the sensor data at the projected location in the frame of reference of the sensor, the object detection controller may be configured to verify that the object detected based on the image data is a valid object detection. In this example manner, the systems and methods described herein may reduce or eliminate false detections of objects in the environment.

In some examples, the determination of the false object detection or the verification of the valid object detection may be communicated to an output device, which may include, for example, a display device configured to display an image indicative of the determination, a machine controller configured to cause (or prevent) a change in operation and/or maneuvering of the machine based on the determination, and/or a location remote from the machine, for example, so that the determination may be used by other machine operators and/or machines (e.g., by semi- or fully-autonomous machines). In some examples, the determination may be incorporated into object detection training data, which may be used, for example, to train an object detection model configured to analyze image data (or other sensor data types) to detect objects in the environment, which may improve the accuracy of future object detections by the object detection model.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. An object detection system comprising:
   an imager configured to generate image data indicative of an environment in which a machine is present relative to a first position, on the machine, of the imager;
   a sensor configured to generate sensor data indicative of the environment in which the machine is present relative to a second position, on the machine, of the sensor;
   an object detection controller comprising one or more object detection processors configured to:
   receive an image signal indicative of the image data;
   identify an object associated with the image data;
   determine a first location of the object relative to the first position of the imager;
   receive a sensor signal, from the sensor, indicative of the sensor data;
   determine, based at least in part on the sensor signal, a presence of the object at the first location; and
   determine a projected location of the object relative to the second position of the sensor, wherein determining the projected location of the object relative to the second position of the sensor comprises transforming the first location of the object from a first frame of reference associated with the first position of the imager to a second frame of reference associated with the second position of the sensor.

2. The system of claim 1, wherein the imager comprises a first imager and the sensor comprises a second imager.

3. The system of claim 1, wherein determining the first location of the object relative to the first position of the imager comprises:
   determining a first distance between the first position of the imager and the first location of the object; and
   determining a first angle indicative of the first location of the object relative to the first position of the imager.

4. The system of claim 1, wherein determining the presence of the object at the first location comprises one of:
   determining the presence of the object at the first location when the sensor signal indicative of the sensor data comprises sensor data indicative of the object at the projected location; or
   determining an absence of the object at the first location when the sensor signal indicative of the sensor data lacks sensor data indicative of the object at the projected location.

5. The system of claim 1, wherein the one or more object detection processors are further configured to substantially temporally align the image data and the sensor data.

6. The system of claim 1, wherein first position of the imager and the second position of the sensor are separated from one another by a separation distance greater than about one foot.

7. The system of claim 1, wherein identifying the object associated with the image data comprises executing an analytical model configured to determine, based at least in part on the image data, the presence of the object, wherein the analytical model comprises an object detection model developed by a machine learning engine.

8. The system of claim 7, wherein the one or more object detection processors are further configured to generate training data for training the object detection model, the training data comprising object detection data associated with one of determining the presence of the object at the first location or an absence of the object at the first location.

9. A method for detecting an object, the method comprising:
receiving an image signal indicative of image data from an imager;
identifying an object associated with the image data;
determining a first location of the object relative to a first position, on the machine, of the imager;
receiving a sensor signal, from the sensor, indicative of sensor data generated by a sensor;
determining, based at least in part on the sensor signal, one of a presence of the object at the first location or an absence of the object at the first location; and
determining a projected location of the object relative to a second position, on the machine, of the sensor, wherein determining the projected location of the object relative to the second position of the sensor comprises transforming the first location of the object from a first frame of reference associated with the first position of the imager to a second frame of reference associated with the second position of the sensor.

10. The method of claim 9, wherein determining the first location of the object relative to the first position of the imager comprises:
determining a first distance between the first position of the imager and the first location of the object; and
determining a first angle indicative of the first location of the object relative to the first position of the imager.

11. The method of claim 9, wherein determining one of a presence of the object at the first location or an absence of the object at the first location comprises one of:
determining the presence of the object at the first location when the sensor signal indicative of the sensor data comprises sensor data indicative of the object at the projected location; or
determining the absence of the object at the first location when the sensor signal indicative of the sensor data lacks sensor data indicative of the object at the projected location.

12. The method of claim 9, further comprising substantially temporally aligning the image data and the sensor data.

13. The method of claim 9, wherein identifying the object associated with the image data comprises executing an analytical model configured to determine, based at least in part on the image data, the presence of the object, wherein the analytical model comprises an object detection model developed by a machine learning engine.

14. The method of claim 13, further comprising:
generating training data for training the object detection model using the machine learning engine, the training data comprising object detection data associated with determining one of the presence of the object at the first location or the absence of the object at the first location; and
training the object detection model using the training data.

15. A machine comprising:
a chassis;
an imager mounted to the chassis at a first position, the imager configured to generate image data indicative of an environment in which the machine is present relative to the first position of the imager;
a sensor mounted to the chassis at a second position, the sensor configured to generate sensor data indicative of the environment in which the machine is present relative to the second position of the sensor, wherein the second position of the sensor is spaced from the first position of the imager; and
an object detection controller comprising one or more object detection processors configured to:
identify, based at least in part on the image data, an object associated with the image data;
determine a first location of the object relative to the first position of the imager;
receive a sensor signal, from the sensor, indicative of the sensor data;
determine, based at least in part on the sensor signal, one of a presence of the object at the first location or an absence of the object at the first location; and
determine a projected location of the object relative to the second position of the sensor, wherein determining the projected location of the object relative to the second position of the sensor comprises transforming the first location of the object from a first frame of reference associated with the first position of the imager to a second frame of reference associated with the second position of the sensor.

16. The machine of claim 15, wherein first position of the imager and the second position of the sensor are separated from one another by a separation distance greater than about one foot.

17. The machine of claim 15, wherein determining the first location of the object relative to the first position of the imager comprises:
determining a first distance between the first position of the imager and the first location of the object; and
determining a first angle indicative of the first location of the object relative to the first position of the imager.

* * * * *